United States Patent Office 2,978,269
Patented Apr. 4, 1961

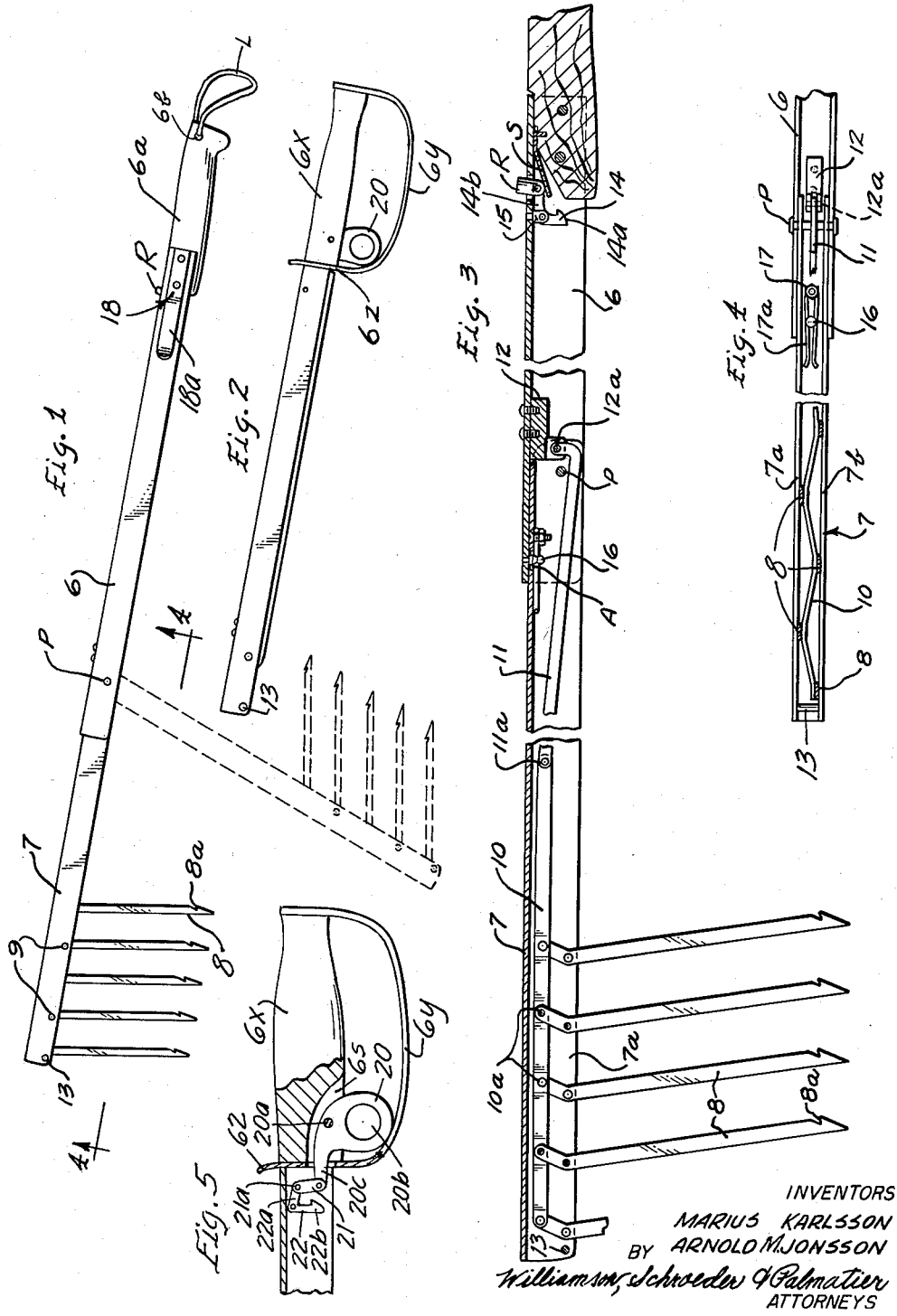

2,978,269
FISH GAFF

Marius Karlsson, Vannacka, and Arnold M. Jonsson, Jarpliden, Sweden, assignors of one-third to Karl Werner Anderson, Arvika, Sweden Filed Jan. 20, 1959, Ser. No. 787,907

5 Claims. (Cl. 294—26)

This invention relates to an improved fish gaff for accurately impaling and landing fish of various sizes.

In the past conventional fish gaffs have employed for the most part, enlarged, sharply pointed hooks mounted at the end of a shank member with the point of the hook extending generally towards the handle for engagement with the gills of a fish or for impaling into the flesh of a fish. Considerable accuracy is required on the part of the angler and in numerous instances in an endeavor to engage the gills or impale the hook, the fish would be dislodged from the fish hook and line.

It is an object of our invention to provide a sturdy but nevertheless, light fish gaff employing a plurality of angulated, preferably barbed prongs rigidly connected in use with an elongated shank and handle member and manipulated or wielded in the manner of a hatchet to quickly and very accurately impale a fish thereon, and to facilitate landing of the fish when it has been previously retrieved to a point several feet away from the boat or other location of the angler.

Another object of the invention is the provision of an angulated prong, fish gaff of collapsible protective structure wherein two hinged shank sections are utilized with the angulated prong or prongs connected to the outer of said sections and wherein the sections may be swingably collapsed into a relatively short dimension while simultaneously the impaling prong or prongs collapse and are nested and protected within the sections.

It is a still further object to provide a pronged collapsible fish gaff of the class described wherein the device may be instantly and swingably extended to full length and the prongs engaged and retained in laterally projecting position from the shank by grasping the handle at the inner end of the inner shank member, touching a release element and then imparting a sharp upward swinging motion to the inner shank member.

These and other objects and advantages of our invention will be more apparent from the following description made in connection with the accompanying drawings wherein like reference characters refer to similar parts throughout the several views and in which:

Fig. 1 is a side elevation of an embodiment of our invention shown in full lines in raised operative position for striking and impaling a fish, the dotted lines indicating an intermediately swung position of the outer shank and prongs during the fast action extension of the parts;

Fig. 2 is a side elevation of the fish gaff in the collapsed and locked position; and a preferred type of handle thereon;

Fig. 3 is a longitudinal section through the entire device in extended or operative position;

Fig. 4 is a view mostly in bottom plan view on a somewhat larger scale and with the intermediate portion of the inner shank section broken away and thus foreshortened and with the several prongs sectioned on the line 4—4 of Fig. 1; and Fig. 5 is a fragmentary view of a somewhat different and preferred form of fish gaff employing a guarded and looped handle and trigger latch mechanism.

In the form of the invention illustrated, we provide an inner, substantially straight shank member 6 preferably of channel shape or U-shaped cross section having an appropriately shaped handle 6a rigidly affixed to the inner end thereof and as shown in Fig. 3, having a diminished portion nested within the inner end of the channel shank 6 and secured thereto by screws or the like.

The channel 6 has hinged to the outer portion thereof some distance from its outer extremity, a slightly narrower outer shank member 7 which also may be of channel construction and of U-shaped cross section and of a thickness or width to be nicely accommodated within the laterally opening channel provided by the shank member 6. The hinge pivot preferably headed at both ends, uniting the two sections indicated by the letter P, is disposed as shown in Figs. 1 and 3 some distance inward from the outer extremity of the inner shank section 6 and also slightly offset downwardly from the longitudinal center line of inner shank section 6. Outer shank section 7 terminates at its normally inner end close to the pivot pin P so that it may swing into collapsed position wholly within the confines of the channel of inner shank section 6. In outwardly swung, operative position the shank members 6 and 7 are substantially aligned and a relatively long abutment is afforded between the two sections extending from a line traversing the pivot pin P to the extremity of the back of inner section 6.

A plurality, as shown five, impaling prongs all indicated by the numeral 8, are each pivotally connected to one or the other side webs of the channeled outer shank section 7, all lying within the confines of said section when collapsed and as shown, starting from the outer end of the device, the first, third and fifth prongs being pivoted to the web 7a of said outer section 7 while the second and fourth of said prongs are pivoted to the opposed web 7b of said outer shank section. All of the prongs as shown are pivoted on suitable pins or rivets 9. With such arrangement it will be seen that the prongs 8 when the device is in the extended or operative position, extend substantially parallel, but in alternately staggered or offset relation to the adjacent prongs.

A common "swing" link 10 extends longitudinally within the confines of the channel of shank section 7 having pivotal connection respectively with the inner ends of all the prong members. Because of the alternatively staggered pivotal connection of the inner ends of the prongs with the shank section, link 10 as clearly shown in Fig. 4 is alternately offset or bent to provide contiguous surfaces near the respective inner ends of the prongs which are pivoted as by small rivets 10a to the inwardly projecting extremities of the prong members 8. The inwardly extending end of the swing link 10 is pivotally connected as by a rivet 11a with the forward end of a second link 11 also extending longitudinally within the confines of outer shank section 7 and projecting into the outer portion of the inner shank section 6 as clearly shown in Figs. 3 and 4. The inner end of this second link 11 is pivotally connected by a rivet or pivot pin 12a with a rigid bracket 12 of angular shape and having a pair of spaced ears at the forward portion thereof between which said link 11 is pivotally engaged. The pivot pin 12a it will be noted, is disposed eccentrically and a slight distance inwardly of the main pivot pin P which hingedly interconnects the two shank sections so that when the sections are swung together from the operative position shown in Figs. 1 and 3, a thrust in an outward direction will be placed upon the links 11 and 10 and upon the pivotal connections between link 10 and the respective inner extremities of the prong members, thereby collapsing and inwardly swinging in unison, the several prong members into the confines of the channel provided by the outer shank member 7 and later in the swinging collapsing action, completely swinging the prongs into substantially longitudinal alignment with the longitudinal marginal portions of the open channel provided by the inner shank section 6.

A rivet or pin 13 braces and traverses the opposed webs 7a and 7b of the outer channel section 7 adjacent the extremity thereof, having the dual function of acting in the capacity of a keeper or latch bar for camming action and engagement with the inclined surface 14a of a latch dog centrally mounted from the intermediate web of the inner channel shank section 6 adjacent the butt or handle end thereof (see Figs. 3 and 4). Latch member 14 as shown is pivoted at its inner end in a bifurcated bracket 15 which is affixed to the said intermediate web of channel 6. The latch dog has a perpendicular release arm 14b which extends rearwardly from the pivot pin and is disposed beneath the free end of a leaf spring S which is secured at its inner end, also to the intermediate web of the channel shank section 6, being urged through tension upwardly or in a direction towards the said intermediate web where with the arm it normally urges a release pin R outwardly. Pin R as shown in Fig. 3 is positioned just forwardly of the handle 6a where it may be lightly pressed with the thumb of the hand wielding the implement, and when depressed, releases the latch which normally holds the device locked in the collapsed position, as shown in Fig. 2, engaging the outer pin 13 of shank section 7.

From the collapsed position shown in Fig. 2, the two sections may be instantly and swingably whipped into alignment and rigid interconnection by releasing the said pin 15a and thereafter imparting a sharp upward swing to the handle and inner shank section 6. The impulse of this swing causes the outer shank section 7 to swing outwardly and upwardly into the aligned position shown in Figs. 1 and 3. This outward swinging of outer shank section 7 through the connection linkage (members 11 and 10) and the eccentric relation of the linkage pivot pin 12a relative to the main hinge pivot P connecting the two sections, places an inward or rearward pull upon the linkage and upon the interconnected inner extremities of the several prongs 8, thereby swinging said prongs from their nested collapsed position to the operative positions shown in Figs. 1 and 3 where the prongs are disposed parallel and at almost a 90 degree angle to the center line of the assembled shank.

The prongs 8 are pointed at their outer extremities and preferably are notched on one or two sides to provide barbs 8a for preventing withdrawal of the prongs in the flesh of a fish when the same are impaled.

It is desirable to releasably lock the two channel shank sections 6 and 7 in the aligned operative position. To this end, a headed stud 16 projects outwardly from the intermediate web of the inner shank section 6 adjacent the extremity thereof and transversely of the length thereof. This stud when the sections 6 and 7 are swung together into alignment is accommodated and passed through a somewhat larger aperture A formed in the appropriate portion of the intermediate web of the outer shank section 7, a short distance from the inner pivoted end of said section. In the final outward swinging of the outer section 7, the stud 16, more exactly the head portion thereof is releasably retained between the legs of the bifurcated resilient locking member 17 which as shown extends longitudinally in close relation to the inner surface of the intermediate web of the outer shank section 7 and is secured at its reversely bent or loop end to the said intermediate flange or web. The tension of the legs 17a of the locking member is sufficient to normally retain the sections in the extended operative position but when force is applied to swing the outward section inwardly the resiliency will permit release of the head of the stud 15.

A resilient hasp or retainer 18 having a curved free forward end 18a for engagement with a belt or loop on the user's apparel may be provided, secured by rivets or other means to the butt end of the inner shank section 6 at one side thereof or if desired, to the forward portion of the handle.

If desired, a rubber or elastic loop member L may be attached to the butt end of the handle through an aperture 6b appropriately formed therein which is adapted to surround the wrist of the user and prevent inadvertent slipping of the handle in the event that the user's hands are wet or slippery.

In use, when a fish has been hooked and played to the extent of drawing it within a few feet of the position of the angler in boat or stream or dock, our gaff device may be readily actuated as previously described by pushing the release element or button R with the thumb while almost simultaneously the inner shank section 6 is forcibly whipped upwardly a slight distance thereby automatically swinging the outer section into position of alignment and causing the sections to be locked by the cooperation of the locking stud 16 with the forked locking member 17. The prongs 8 are then disposed and positively retained at an angle approaching 90 degrees relatively to the center line of the then assembled shank. This may all be accomplished with one hand and arm of the operator while the rod or pole is manipulated with the other hand.

When the fish is brought into reach of the elongated shank, the implement is swung or wielded in the manner of a hatchet or tomahawk to impale one or more of the barbed prongs 8 into the flesh of the fish at back or sides. The alternate staggering of the several prongs 8 contributes to the accuracy and effectiveness of the blow imparted with the result that usually two or more of the prongs will actually impale the flesh of the fish at spaced points and points usually staggered with reference to a longitudinal line on the fish's back or sides. When the fish is impaled the device may be manipulated gently by swinging the fish towards the boat or landing it and then upwardly with the weight entirely supported by the prongs and shank.

From the foregoing description it will be seen that we have provided a comparatively simple and highly efficient fish gaff which through its inherent structure and operation assures successful results in landing fish varying considerably in size and weight. Because of the plurality of staggered prongs 8 and their angulation to the over-all shank of the device, even a novice will seldom miss in the swinging or hatchet-like use of the device. The gaff structure is strong and will withstand hard use.

With our structure the prongs are automatically swung from nested and completely protected position within the two shank sections to the operative, outwardly extending angular positions shown in Figs. 1 and 3 through the relative swinging of the shank sections 6 and 7.

In Figs. 2 and 4 a different and preferred handle and latch release mechanism is illustrated. The handle proper 6x is secured in the manner previously described to the rear end of the shank channel 6 and is shaped nicely to conform to the clenched hand of the user and includes a preferably rigid retaining loop and guard element 6y which is secured at one of its ends to the butt of the handle and which preferably overlaps the forward end of the handle surrounding the same and providing a guard extension 6z. The forward portion of the handle proper 6x is slotted as indicated at 6s to accommodate the rearward portion of a trigger plate 20 which is intermediately pivoted on a cross pin 20a which extends perpendicularly across the slotted portion. The rear portion of the trigger plate 20 has a finger grip 20b which in the form shown is of apertured construction in the plate. The forward end of the trigger plate is diminished in the form of a lever arm 20c which is pivoted to the lower end of a short link 21 pivoted at its upper end within the rear end of the channel shank 6 on pin 21a. Pin 21a connects the upper end of link 21 with the rearwardly extending arm 22a of bell crank latch lever indicated as an entirety by the numeral 22. The bell crank latch lever has a depending latch element or arm 22b which terminates in a hook or detent and which has a lower inclined surface for cam action when the two shank sections 6 and 7 are swung together, the hook then engaging and locking with the cross pin 13 affixed to the free end of the outer shank section 7. With the trigger and latch structure just described, it will be apparent that the user retains a very firm grasp upon the shank structure of the gaff through the looped handle element 6y and further through closing of the hand upon the main portions 6x of the handle. Thus, in use, even a powerful fish will be unable to pull the device out of the user's hand.

To actuate and release the latch for quick use of the device when collapsed (as shown in Fig. 2), the user with the index finger of the hand pulls rearwardly upon the trigger grip 20b, swinging the trigger plate 20 which in turn swings the bell crank latch element 22 clockwise to release engagement of the detent on the arm 22b of the latch with the rigid pin 13 which is positioned at the outer end of the outer shank 7 when in use.

It will, of course, be understood that various changes may be made in the form, details and arrangement of parts, all without departing from the scope of our invention.

What is claimed is:

1. A collapsible, pronged fish gaff comprising a pair of hinged shank sections, the inner of said sections having a handle at one end thereof and also having an open channel at one edge thereof for receiving the outer hinged shank section, said outer shank section having pivoted thereto a plurality of impaling prongs disposed in substantially parallel relation, a link extending longitudinally of said outer shank section pivotally connected with the inner ends of said prongs at points beyond and eccentric of their hinged connections with said shank and a pivotal second link connection between the inner end of said first link and said inner shank disposed on an axis adjacent to but disposed inwardly and eccentrically of the hinged connection between said shank sections whereby swinging of said sections apart into substantially aligned position through said link connection produces outward swinging of said prongs to positions angled to said shank and inward swinging of said sections together produces collapsing and receiving of said outer shank section within said inner shank section together with collapsing and inward swinging of said prongs into substantially aligned relation, extending longitudinally of said shank sections.

2. The structure set forth in claim 1 wherein the hinge connection between said shank sections is disposed adjacent the inward end of said outer section and some distance inwardly of the outer end of said inner shank section to produce substantial abutment between longitudinal edges of said sections when the sections are swung to aligned operative positions and means for releasably locking said sections in such abutting relation.

3. The structure set forth in claim 1 further characterized by cooperating latch elements provided in the inner portion of said inner shank sections and in the outer portion of said outer shank sections respectively for engaging and releasably locking said sections together in collapsed position when said outer section has been swung inwardly into collapsed position against said inner shank section.

4. The structure set forth in claim 3 further characterized by a finger actuated release element associated with said handle for disengaging said cooperating latch elements.

5. A collapsible, pronged fish gaff comprising a pair of hingedly joined interfitting shank sections, the inner of said sections having a handle at one end thereof and also having an open channel at one edge thereof for receiving the outer hinged shank section, said outer shank section having pivoted thereto a plurality of impaling prongs disposed in substantially parallel relation, a link extending longitudinally of said outer shank section pivotally connected with the inner ends of said prongs at points beyond and eccentric of their hinged connections with said shank and a pivotal connection between the inner end of said link and said inner shank disposed on an axis adjacent to but disposed inwardly and eccentrically of the hinged connection between said shank sections whereby swinging of said sections apart into substantially aligned position through said link connection produces outward swinging of said prongs to positions angled to said shank and inward swinging of said sections together produces collapsing and receiving of said outer shank section within said inner shank section together with collapsing and inward swinging of said prongs into substantially aligned relation, extending longitudinally of said shank sections, a pair of cooperating interlocking elements, one carried adjacent the outer end of said inner shank section and the second carried adjacent the inner end of said outer shank section positioned to interlock for rigidifying the joint between said hinged sections when the same are swung to aligned position, said outer section having a cross pin adjacent the free end thereof, a shiftable latch element mounted within the rear portion of said inner channel section for interlocking with said pin when said shank sections are swung together, and a finger actuated release element associated with said handle and connected to release said interlocking relation of said latch element when finger actuated.

References Cited in the file of this patent
UNITED STATES PATENTS

| 2,112,765 | Darling | Mar. 29, 1938 |
| 2,580,361 | Muhm | Dec. 25, 1951 |
| 2,603,521 | Taylor et al. | July 15, 1952 |
| 2,882,084 | Eatinger | Apr. 14, 1959 |